J. T. WHITTOME.
ROAD SWEEPING MACHINE.
APPLICATION FILED APR. 4, 1911.

1,042,860.

Patented Oct. 29, 1912.

Witnesses:

Inventor:
John Thomas Whittome

UNITED STATES PATENT OFFICE.

JOHN THOMAS WHITTOME, OF TAVISTOCK, ENGLAND.

ROAD-SWEEPING MACHINE.

1,042,860.   Specification of Letters Patent.   Patented Oct. 29, 1912.

Application filed April 4, 1911. Serial No. 618,792.

*To all whom it may concern:*

Be it known that I, JOHN THOMAS WHITTOME, a subject of the Kingdom of Great Britain, residing at Parkwood Road, Tavistock, in the county of Devon, England, engineer, have invented certain new and useful Improvements in or Relating to Road-Sweeping Machines, of which the following is a specification.

This invention comprises improvements in or pertaining to combined street sweepers and collectors, and it has for its purpose primarily to provide an apparatus which while being particularly efficient and satisfactory in operation is at the same time very simple in construction.

According to the invention the brush is arranged in front of the container and the means of communication with said container are positioned above the upper end front portions of the brush so that the mud, dust, and the like are effectually discharged into the container by the action of centrifugal force.

In order that this invention may be clearly understood and more readily carried into practice, reference may be had to the appended three sheets of drawings, upon which:—

Figure 1:
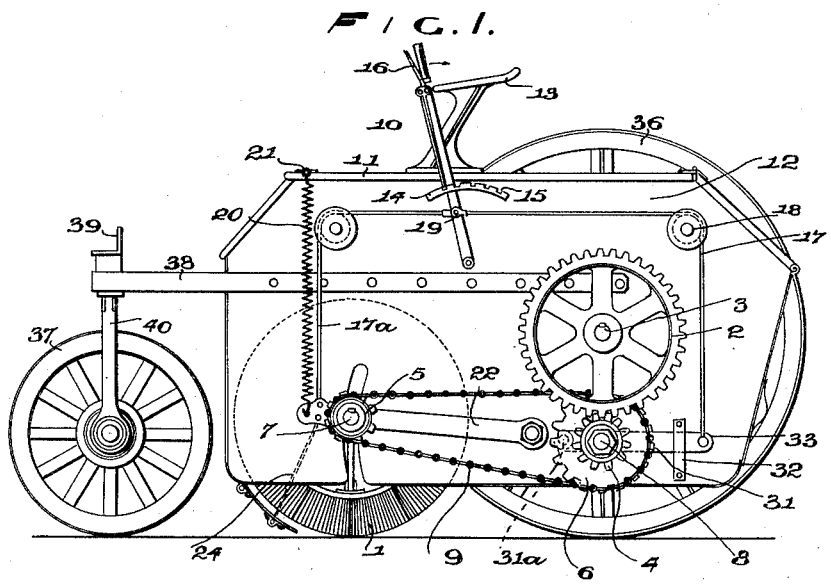
Figure 2:
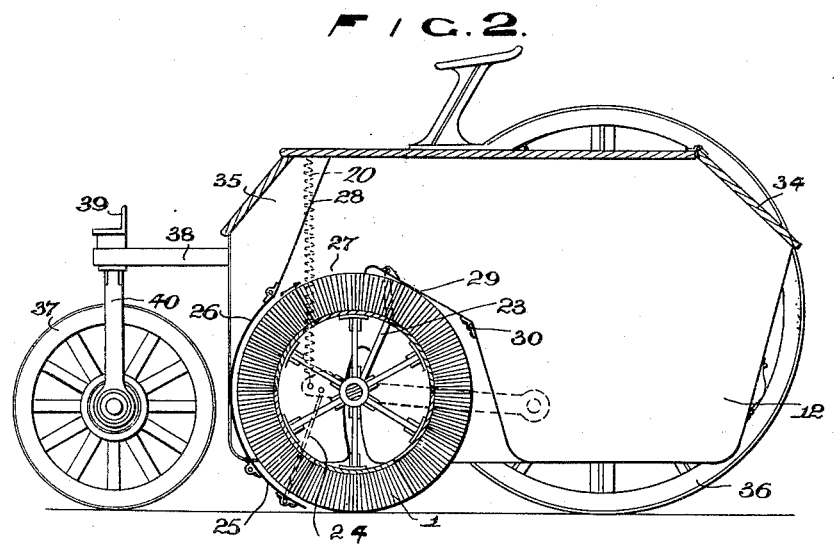

Figure 1 is a side elevation of a machine according to the invention, having one rear wheel of the running gear omitted. Fig. 2 is a sectional elevation of the machine shown in Fig. 1.

In the drawings, a receptacle or cart of suitable shape and capacity is provided with running gear to enable the sweeper to be drawn or propelled by animal traction, or it may be adapted for mechanical propulsion.

The revolving brush 1 may receive motion from a suitable source such as the road wheel of the vehicle, suitable transmitting means comprising a spur wheel 2 of comparatively large diameter mounted upon the road wheel or axle 3 of the vehicle, a pinion 4 meshing with said driving toothed wheel 2 and disposed below same, sprocket wheels 5, 6 mounted respectively on the revolving brush axle 7 and upon the said pinion or its shaft 8, and a chain 9 running over and connecting the said sprockets.

Arrangements may be made whereby the two spur wheels are capable of disconnection and also for elevating the brush, and to this end a lever 10 or pedals are mounted on the top 11 of the container 12, at such a position as is convenient for the driver, a seat 13 fixed to the top of the receptacle being incorporated for his accommodation. A quadrant 14 having notches 15 may be secured to the side of the container to retain in conjunction with a detent and release lever 16 the brush and the spur wheel 4 in the desired position.

Coupling means for connecting the pedals or levers with the parts to be elevated or depressed may consist of a wire rope or cable 17 passing over curved guide pulleys 18 which are mounted on suitable pivots, a pivot connection 19 allowing the wire rope or cable to adjust itself to the angularity of the lever 10. The brush 1 is partially suspended by a spring 20 hung from a bracket 21, so as to allow the brush 1 to have an up-and-down movement, in order that it may adapt itself to the variations in the contour of the road surface. For the purpose of maintaining the two sprocket wheels at an unvarying relative distance apart, the brush shaft is mounted in the ends of arms 22 having their other ends pivoted to the sides of receptacle 12 near the axis of the sprocket 6. The brush axle is connected to plate 29 by rods 23 and the arms 22 to the plate 25 by chains 24 to always keep the plates which direct the mud or the like into the interior of the cart or receptacle, at the correct distance from the periphery of the brush.

The front portion of the casing may comprise a fixed wall or plate 28 to which is hinged a curved plate 26, extending about the forward periphery of the brush. The guard 25 hinged to the curved plate 26, extends downwardly in advance of the brush, and toward the street surface, as will be seen by reference to Figs. 1 and 2. The other plate or drop board limiting the size of the aperture in a rearward direction consists of a plate 29 hinged at its rear extremity 30 to the tank, and being pivotally connected with the connecting rod 23 aforedescribed.

To effect the elevation or depression of the lower rear wheel 4 for throwing the spur wheels in and out of mesh, the arm 31 upon which said pinion is carried is pivotally supported at 31ᵃ by a bracket which is in turn carried by the container. The free extremity 33 of the arm 31 has attached to it one extremity of the wire cable 17 or a rigid rod as the case may be and a strip or bar 32 may be attached to the container to prevent lateral movement of the arm 31. Upon the lever 10 being operated in the direction indicated by the arrow in Fig. 1, the arm 31 swings about its pivot 31ª in a downward direction while a reverse movement is imparted to the arm 22 thus effecting disengagement of the gear wheel 4 from the driving gear wheel 2 and at the same time lifting the brush 1 off the road-way, the release lever and detent 16 locking the parts in the non-operant position.

The receptacle extends around the back of the brush and may be furnished with a door 34 conveniently at the rear upper portion, to allow access to the interior of the receptacle. Suitable side or cover plates 35 may be provided to protect the mechanism and to impart a neat aspect to the exterior of the apparatus.

In Figs. 1 and 2, 36 is one of the back wheels, 37 is the front wheel which is mounted on a swivel, 38 is the frame riveted or bolted to the side of the container and extending forwardly to the front wheel fork 40 and 39 is a fixture for the shafts by which the machine is drawn.

While I have herein shown and described one specific form of my invention it will be understood that I do not wish to be limited thereto except for such limitations as the claims import.

What I claim as my invention and desire to secure by Letters Patent is:—

1. A street sweeper comprising in combination, supporting wheels, a rotary brush, a casing mounted on said wheels and having a sweepings receiver in the rear of the brush and an opening for receiving the sweepings disposed above the upper and front portions of the brush, a flap hinged to the casing and forming the rear wall of said opening, a guard hinged to the casing and extending downwardly in advance of the brush, arms pivoted on the casing and connected with the shaft of the brush, springs carried by the casing and yieldingly supporting the brush, and devices connecting the yieldingly supported brush with the hinged flap and guard to maintain the same in predetermined relation with respect to the brush, substantially as described.

2. A street sweeper comprising in combination, supporting wheels, an adjustable rotary brush, a casing having a sweepings receiver mounted on said wheels and provided with an opening for receiving the sweepings, a flap hinged to the casing and forming one wall portion of said opening, a guard hinged to the casing adjacent the brush and street surface, and devices maintaining the guard and flap in predetermined relation with respect to the brush irrespective of the position of adjustment of said brush, substantially as described.

3. A street sweeper comprising in combination, supporting wheels, a casing supported on said wheels and having a sweepings receiver provided with an opening for receiving the sweepings, a brush for delivering to said opening, springs carried by the casing for yieldably supporting said brush, a flap hinged to said casing and forming one wall portion of said opening, a guard hinged to said casing adjacent the brush and street surface, and devices maintaining the guard and flap in predetermined relation with respect to the brush irrespective to the position of said brush, substantially as described.

In witness whereof I have hereunto set my hand in the presence of two witnesses.

JOHN THOMAS WHITTOME.

Witnesses:
ARTHUR JOSEPH FORSHEW,
CHARLES BEVIS.